Dec. 2, 1952      D. E. STEM      2,619,674
MAGNETIC TRAPPING DEVICE
Filed May 24, 1949
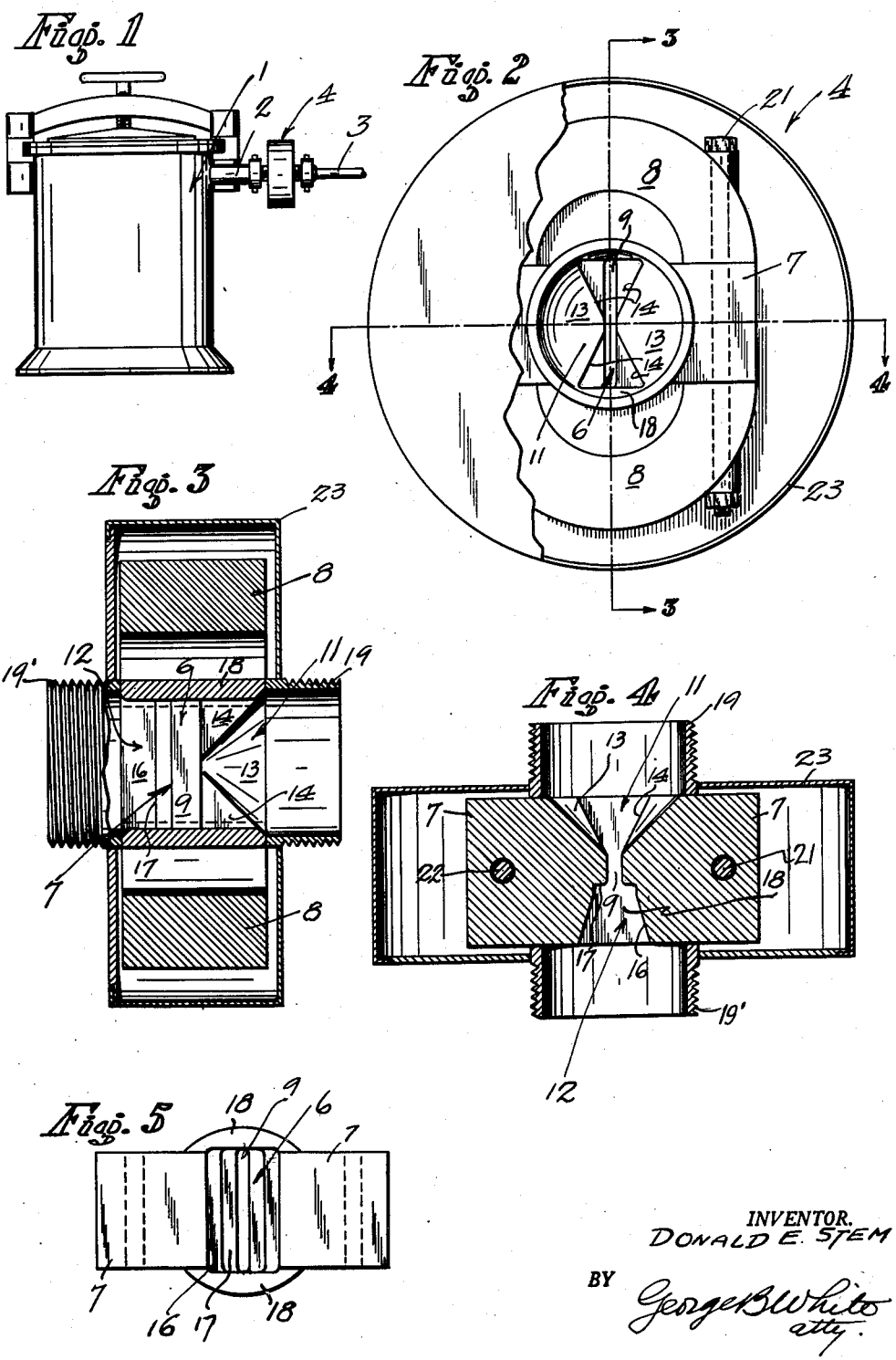
INVENTOR.
DONALD E. STEM
BY George B. White
atty.

Patented Dec. 2, 1952

2,619,674

UNITED STATES PATENT OFFICE 2,619,674

MAGNETIC TRAPPING DEVICE

Donald E. Stem, San Francisco, Calif.

Application May 24, 1949, Serial No. 96,066

8 Claims. (Cl. 17—35)

This invention relates to a device for trapping magnetic particles, and particularly to such device in so called sausage stuffing.

The primary object of this invention is to provide a magnetic trap capable of concentrating a very intense magnetic field around a passage through which material is pressed so as to effectively trap magnetic particles from such material, and particularly to form the passage through the magnetic field so as to guide said material through the most effective portion of the magnetic field and further to permit the same pressure to be utilized for passing said material through said passage and also for stuffing said cleared material into a casing, as in the sausage making process and device.

Features of my invention include: the forming of comparatively solid pole pieces, preferably out of a single piece of magnetic material cut through so as to shape a suitable passage through the strong magnetic field created by permanent magnets; the sections of the magnetic body being fixedly held together and provided with suitable connecting nipples adapted to interconnect the unit into a conduit.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a side view of a sausage stuffing apparatus with my magnetic trap assembled therein.

Fig. 2 is a face view, partly broken away of my magnetic trap on an enlarged scale.

Fig. 3 is a sectional view of my magnetic trap, the section being taken on the lines 3—3 of Fig. 2.

Fig. 4 is a sectional view of my magnetic trap, the section being taken on the lines 4—4 of Fig. 2, and Fig. 5 is a view of the magnetic body of my trap viewing the outlet end of the passage.

In the illustrative embodiment herein, my invention includes a sausage mix pressing and feeding device 1, the feed conduits 2 of which normally lead to a horn 3, on which latter the usual casing, not shown, is held to be stuffed. My magnetic trap 4 is interconnected between said device 1 and said horn 3 at any selected point so that the sausage mix is compelled to pass through the passage of the magnetic trap, subject to an intense magnetic field.

My magnetic trap, in detail, includes a magnetic body 7 with the passage 6 formed therethrough, and powerful permanent magnets 8 mounted on opposite sides of said magnetic body 7. The passage 6 divides the body 7 into two separate sections forming pole pieces on the opposite sides of said passage 6.

The passage 6, in the herein illustration, is formed by an elongated slit 9, substantially diametrical, or transverse, to the conduits connected to the magnet. An intake chamber 11 is formed on one side of the slit 9 and an outlet chamber 12 at the opposite end of the slit 9. The inlet chamber 11 is adapted to direct the flow to the most intense portions of the magnetic field through said slit 9. The inlet chamber 11 has generally frusto-conical side segments 13 which merge into opposed plane sides 14 diverging from the middle outwardly and oppositely toward opposite ends of the slit 9. Thus the flow is directed toward the middle of the slit 9.

The outlet chamber 12 has outwardly flaring sides 16, and a shoulder 17 formed at each edge of the slit 9 at the base of each outlet side 16. The magnetic particles that may be swept through the slit 9 are swept over said shoulders 17, which latter form pockets at the opposite sides of the flow to retain such metallic particles in the magnetic field.

The sections or pole pieces of the magnetic body 7 are held together by non-magnetic connecting cylinder segments 18, welded across the top and bottom of the passage 6 as shown in Figs. 3 and 5, so as to fixedly hold said sections or pole pieces together around said passage 6. Non-magnetic threaded conduits 19 and 19' are welded respectively to the inlet end and the outlet end of said cylinder segments 18 and to the adjacent portions of the body 7 for connection by suitable couplings to the conduits for the flow of mix or material handled. The completed unit, therefore, forms a generally tubular conduit of two spaced non-magnetic sections 19 and 19', and the magnetic body 7 held between said conduit sections 19 and 19' so that it forms a third conduit section to permit the passage of the sausage mix through said sections and the trapping of magnetic particles during said passage.

The pole pieces or body 7 are magnetized by permanent magnets 8 mounted by suitable bolts 21 and 22 on opposite sides of the body 7.

The entire unit is covered by a non-magnetic casing 23, preferably integrally mounted over said magnets and body.

The cleaning and removal of trapped particles from the magnetized passage is accomplished easily by pushing a non-magnetic spatula through said passage 6 so as to push the particles to the outer fringes of the passage from where the particles can be lifted manually or by suitable non-magnetic tweezers or pliers.

The device is of a unitary character, integrally united parts of which have their exposed surfaces suitably finished to form smooth, sanitary passages without cracks, thereby positively preventing bacterial accumulation.

I claim:

1. For use with a sausage stuffing device, a tubular conduit comprising two spaced sections, a magnetic body interconnected therebetween to form a third conduit section, said magnetic body having a longitudinal passage permitting passage of sausage mix through said sections.

2. For use with a sausage stuffing device, a tubular conduit comprising two spaced sections, a magnetic body interconnected therebetween to form a third conduit section, said magnetic body having a longitudinal passage permitting passage of sausage mix through said sections, said spaced sections being non-magnetic.

3. For use with a sausage stuffing device, a tubular conduit comprising two spaced sections, a magnetic body interconnected therebetween to form a third conduit sections, said magnetic body having a longitudinal passage permitting passage of sausage mix through said sections, a permanent magnet on said magnetic body and a non-magnetic covering around said magnet and said body.

4. For use with a sausage stuffing device, a tubular conduit comprising two spaced sections, a magnetic body interconnected therebetween to form a third conduit section, said magnetic body having a longitudinal passage permitting passage of sausage mix through said sections, said longitudinal passage being in the form of a slit narrower than the width of said conduit in said spaced sections.

5. For use with a sausage stuffing device, a tubular conduit comprising two spaced sections, a magnetic body interconnected therebetween to form a third conduit section, said magnetic body having a longitudinal passage permitting passage of sausage mix through said sections, said longitudinal passage being in the form of a slit narrower than the width of said conduit in said spaced sections and an enlarged outlet chamber formed in said magnetic body between said slit and one of said sections.

6. For use with a sausage stuffing device, a tubular conduit comprising two spaced sections, a magnetic body interconnected therebetween to form a third conduit section, said magnetic body having a longitudinal passage permitting passage of sausage mix through said sections, said longitudinal passage being in the form of a slit narrower than the width of said conduit in said spaced sections and an enlarged outlet chamber formed in said magnetic body between said slit and one of said sections, and a shoulder formed along each side of said slit in said outlet chamber forming a pocket to collect magnetic particles swept through said slit.

7. For use with a sausage stuffing device, a tubular conduit comprising two spaced sections, a magnetic body interconnected therebetween to form a third conduit section, said magnetic body having a longitudinal passage permitting passage of sausage mix through said sections, said longitudinal passage being in the form of a slit narrower than the width of said conduit in said spaced sections and an enlarged outlet chamber formed in said magnetic body between said slit and one of said sections, and a shoulder formed along each side of said slit in said outlet chamber forming a pocket to collect magnetic particles swept through said slit, said outlet chamber diverging toward the adjacent section.

8. For use wiht a sausage stuffing device, a tubular conduit comprising two spaced sections, a magnetic body interconnected therebetween to form a third conduit section, said magnetic body having a longitudinal passage permitting passage of sausage mix through said sections, said longitudinal passage being in the form of a slit narrower than the width of said conduit in said spaced sections and an enlarged outlet chamber formed in said magnetic body between said slit and one of said sections, and a shoulder formed along each side of said slit in said outlet chamber forming a pocket to collect magnetic particles swept through said slit, and an intake chamber in said magnetic body converging from the other section to said slit.

DONALD E. STEM.

REFERENCES CITED

The following references are of record in the file of this patent:

UNITED STATES PATENTS

| Number | Name | Date |
|---|---|---|
| 451,885 | Wheeler | May 5, 1891 |
| 971,692 | Schnelle | Oct. 4, 1910 |
| 1,148,990 | Rogers | Aug. 3, 1915 |
| 1,317,992 | Sekinger | Oct. 7, 1919 |
| 1,432,920 | Swanson | Oct. 24, 1922 |
| 1,466,310 | Mann | Aug. 28, 1923 |
| 2,373,865 | Walter | Apr. 17, 1945 |
| 2,427,202 | Dryek et al. | Sept. 9, 1947 |
| 2,436,740 | Brooks | Feb. 24, 1948 |

FOREIGN PATENTS

| Number | Country | Date |
|---|---|---|
| 254,030 | Great Britain | July 1, 1926 |
| 643,237 | France | May 15, 1928 |